United States Patent
Emi

(10) Patent No.: US 10,203,480 B2
(45) Date of Patent: *Feb. 12, 2019

(54) LENS SYSTEM

(71) Applicant: Panasonic Intellectual Property Management Co., Ltd., Osaka (JP)

(72) Inventor: Kenichi Emi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/911,807

(22) Filed: Mar. 5, 2018

(65) Prior Publication Data

US 2018/0196232 A1    Jul. 12, 2018

Related U.S. Application Data

(63) Continuation of application No. 15/148,404, filed on May 6, 2016, now Pat. No. 9,939,613, which is a
(Continued)

(30) Foreign Application Priority Data

Nov. 12, 2013    (JP) ................................. 2013-233733

(51) Int. Cl.
*G02B 13/18*    (2006.01)
*G02B 13/00*    (2006.01)
(Continued)

(52) U.S. Cl.
CPC ............ *G02B 13/004* (2013.01); *B60R 11/04* (2013.01); *G02B 9/34* (2013.01); *G02B 13/006* (2013.01);
(Continued)

(58) Field of Classification Search
CPC ........ G02B 13/18; G02B 13/04; G02B 5/005; G02B 9/04; G02B 7/008; G02B 7/028
(Continued)

(56) References Cited

U.S. PATENT DOCUMENTS 6,987,623 B2    1/2006  Shibayama
8,462,439 B2    6/2013  Oskotsky
(Continued)

FOREIGN PATENT DOCUMENTS

JP    10-282407    10/1998
JP    2006-134526    5/2006
(Continued)

OTHER PUBLICATIONS

International Search Report (ISR) dated Jan. 27, 2015 in International (PCT) Application No. PCT/JP2014/005414.

*Primary Examiner* — Evelyn A Lester
(74) *Attorney, Agent, or Firm* — Wenderoth, Lind & Ponack, L.L.P.

(57) ABSTRACT

A single focal length lens system which, in order from an object side to an image side, includes a first unit, an aperture diaphragm, and a second unit is provided. The second unit includes a cemented lens having positive optical power, and a joint surface of the cemented lens is an aspheric surface. The cemented lens satisfies a condition: $|dn/dt1|_{MAX} \leq 2.67 \times 10^{-5}$ ($|dn/dt1|_{MAX}$: A Maximum Value of Absolute Values of Relative Refractive Index temperature coefficients in an atmosphere at 0 to 20° C. with respect to light having a wavelength range of 580 to 640 nm, which is calculated for each of lens elements constituting the cemented lens).

8 Claims, 14 Drawing Sheets

Related U.S. Application Data continuation of application No. PCT/JP2014/005414, filed on Oct. 27, 2014.

(51) Int. Cl.

| | | |
|---|---|---|
| *G02B 13/04* | (2006.01) | |
| *G02B 13/16* | (2006.01) | |
| *B60R 11/04* | (2006.01) | |
| *G02B 9/34* | (2006.01) | |
| *H04N 5/232* | (2006.01) | |
| *H04N 7/18* | (2006.01) | |
| *G02B 7/02* | (2006.01) | |
| *G02B 7/00* | (2006.01) | |
| *G02B 5/00* | (2006.01) | |
| *G02B 9/04* | (2006.01) | |

(52) U.S. Cl.
CPC .............. *G02B 13/04* (2013.01); *G02B 13/16* (2013.01); *H04N 5/23212* (2013.01); *H04N 5/23238* (2013.01); *H04N 7/183* (2013.01); *B60R 2300/10* (2013.01); *B60R 2300/8046* (2013.01); *G02B 5/005* (2013.01); *G02B 7/008* (2013.01); *G02B 7/028* (2013.01); *G02B 9/04* (2013.01); *G02B 13/18* (2013.01)

(58) Field of Classification Search
USPC ........ 359/717, 737, 739, 740, 741, 753, 793
See application file for complete search history.

(56) References Cited

U.S. PATENT DOCUMENTS

| | | | |
|---|---|---|---|
| 9,939,613 B2 * | 4/2018 | Emi | .................... G02B 13/004 |
| 2006/0274433 A1 | 12/2006 | Kamo | |
| 2007/0206295 A1 | 9/2007 | Yamashita et al. | |
| 2008/0074761 A1 | 3/2008 | Yamakawa et al. | |
| 2008/0316609 A1 | 12/2008 | Robinson | |
| 2009/0009888 A1 | 1/2009 | Asami | |
| 2010/0188757 A1 | 7/2010 | Saitoh | |
| 2010/0201782 A1 | 8/2010 | Yamada | |
| 2010/0254025 A1 | 10/2010 | Yoshida et al. | |
| 2012/0033311 A1 | 2/2012 | Uemura | |
| 2016/0320613 A1 | 11/2016 | Emi | |

FOREIGN PATENT DOCUMENTS

| | | |
|---|---|---|
| JP | 2006-284620 | 10/2006 |
| JP | 2006-337691 | 12/2006 |
| JP | 2007-233152 | 9/2007 |
| JP | 2008-76716 | 4/2008 |
| JP | 2009-3455 | 1/2009 |
| JP | 2009-31762 | 2/2009 |
| JP | 2009-63877 | 3/2009 |
| JP | 2010-243711 | 10/2010 |

* cited by examiner

LENS SYSTEM

CROSS-REFERENCE TO RELATED APPLICATION

This application is a Continuation of application Ser. No. 15/148,404, filed May 6, 2016, which is a Continuation of International Application No. PCT/JP2014/005414, filed on Oct. 27, 2014, which in turn claims the benefit of Japanese Application No. 2013-233733 filed on Nov. 12, 2013, the disclosures of which Applications are incorporated by reference herein.

BACKGROUND

Field

The present disclosure relates to single focal length lens systems, cameras, and automobiles.

Description of the Related Art

Japanese Laid-Open Patent Publication No. 2008-076716 discloses a wide-angle lens system having a relatively small number of lenses, i.e., six lenses as a whole, in which the shape, arrangement, and the like of each lens are optimized.

SUMMARY

The present disclosure provides a single focal length lens system which has a sufficiently wide angle of view, a small size, and excellent temperature characteristics. In addition, the present disclosure provides a camera including the single focal length lens system, and an automobile including the camera.

A single focal length lens system according to the present disclosure, in order from an object side to an image side, includes: a first unit; an aperture diaphragm; and a second unit, wherein the first unit includes a lens element made of glass at a position closest to the object side, the second unit includes a cemented lens having positive optical power, and a joint surface of the cemented lens is an aspheric surface, and the following conditions (1), (2) and (3) are satisfied:

$$|dn/dt1|_{MAX} \leq 2.67 \times 10^{-5} \quad (1)$$

$$2\omega_{DIA} \geq 150 \quad (2)$$

$$2.0 < f_{CEM}/f < 4.0 \quad (3)$$

where $|dn/dt1|_{MAX}$ is a maximum value of absolute values of relative refractive index temperature coefficients in an atmosphere at 0 to 20° C. with respect to light having a wavelength range of 580 to 640 nm, which is calculated for each of lens elements constituting the cemented lens, $2\omega_{DIA}$ is a diagonal angle of view (°), $f_{CEM}$ is a focal length at d-line of the cemented lens, and f is a focal length at d-line of the entire system.

A camera according to the present disclosure includes:
a single focal length lens system; and
an imaging device which captures an image of light converged by the single focal length lens system, wherein
the single focal length lens system, in order from an object side to an image side, includes: a first unit; an aperture diaphragm; and a second unit, wherein the first unit includes a lens element made of glass at a position closest to the object side, the second unit includes a cemented lens having positive optical power, and a joint surface of the cemented lens is an aspheric surface, and the following conditions (1), (2) and (3) are satisfied:

$$|dn/dt1|_{MAX} \leq 2.67 \times 10^{-5} \quad (1)$$

$$2\omega_{DIA} \geq 150 \quad (2)$$

$$2.0 < f_{CEM}/f < 4.0 \quad (3)$$

where $|dn/dt1|_{MAX}$ is a maximum value of absolute values of relative refractive index temperature coefficients in an atmosphere at 0 to 20° C. with respect to light having a wavelength range of 580 to 640 nm, which is calculated for each of lens elements constituting the cemented lens, $2\omega_{DIA}$ is a diagonal angle of view (°), $f_{CEM}$ is a focal length at d-line of the cemented lens, and f is a focal length at d-line of the entire system.

An automobile according to the present disclosure includes:
a camera; and
a processing unit which detects external environment on the basis of the image captured by an t imaging device included in the camera, and controls each part, wherein
the camera includes:
a single focal length lens system; and
an imaging device which captures an image of light converged by the single focal length lens system, wherein
the single focal length lens system, in order from an object side to an image side, includes: a first unit; an aperture diaphragm; and a second unit, wherein the first unit includes a lens element made of glass at a position closest to the object side, the second unit includes a cemented lens having positive optical power, and a joint surface of the cemented lens is an aspheric surface, and the following conditions (1), (2) and (3) are satisfied:

$$|dn/dt1|_{MAX} \leq 2.67 \times 10^{-5} \quad (1)$$

$$2\omega_{DIA} \geq 150 \quad (2)$$

$$2.0 < f_{CEM}/f < 4.0 \quad (3)$$

where $|dn/dt1|_{MAX}$ is a maximum value of absolute values of relative refractive index temperature coefficients in an atmosphere at 0 to 20° C. with respect to light having a wavelength range of 580 to 640 nm, which is calculated for each of lens elements constituting the cemented lens, $2\omega_{DIA}$ is a diagonal angle of view (°), $f_{CEM}$ is a focal length at d-line of the cemented lens, and f is a focal length at d-line of the entire system.

The single focal length lens system according to the present disclosure has a diagonal angle of view significantly widened to about 150° or more, is small in size, causes less change in optical characteristics even with temperature change in a range of about 20 to 80° C., and also has excellent temperature characteristics.

DETAILED DESCRIPTION

Hereinafter, embodiments will be described in detail with reference to the drawings as appropriate. However, descriptions more detailed than necessary may be omitted. For example, detailed description of already well known matters or description of substantially identical configurations may be omitted. This is intended to avoid redundancy in the description below, and to facilitate understanding of those skilled in the art.

It should be noted that the inventors provide the attached drawings and the following description so that those skilled in the art can fully understand this disclosure. Therefore, the drawings and description are not intended to limit the subject defined by the claims.

In the present disclosure, a first unit is a unit composed of at least one lens element, and a second unit is a unit composed of at least two lens elements. The power, the composite focal length, and the like of each unit are determined in accordance with the type, the number, the arrangement, and the like of the lens elements constituting the unit.

Embodiments 1 to 6: Single Focal Length Lens System

FIGS. 1, 3, 5, 7, 9 and 11 are lens arrangement diagrams of single focal length lens systems according to Embodiments 1 to 6, respectively, and each diagram shows the single focal length lens system in an infinity in-focus condition. In each Fig., an asterisk "*" imparted to a particular surface indicates that the surface is aspheric. In each Fig., a straight line located on the most right-hand side indicates the position of an image surface S. A parallel plate CG is disposed on the object side of the image surface S Embodiment 1

Figure 1:
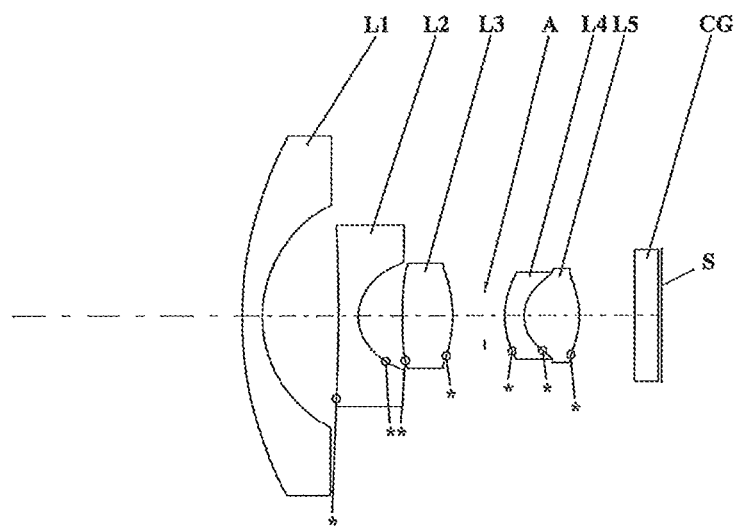
FIG. 1 is a lens arrangement diagram showing an infinity in-focus condition of a single focal length lens system according to Embodiment 1 (Numerical Example 1)
Figure 2:
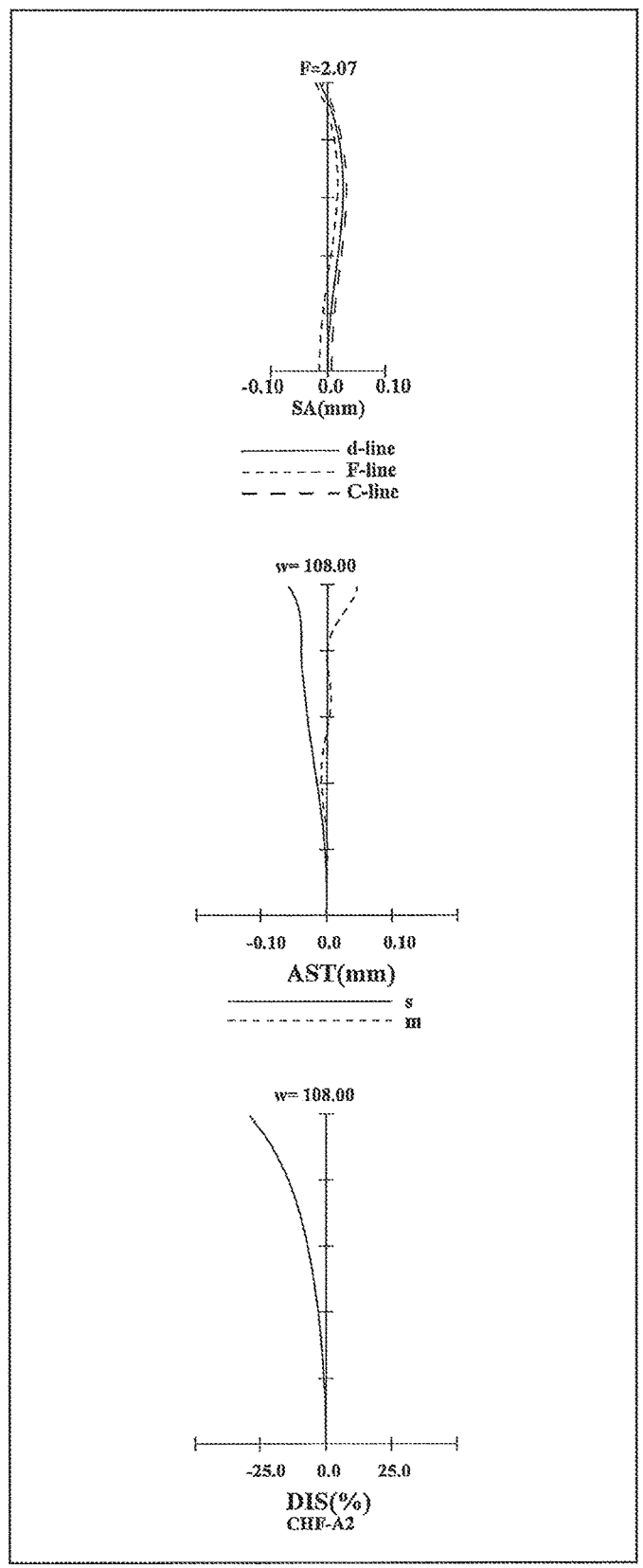
FIG. 2 is a longitudinal aberration diagram of the infinity in-focus condition of the single focal length lens system according to Numerical Example 1.

As shown in FIG. 1, the single focal length lens system according to Embodiment 1, in order from the object side to the image side, comprises a first lens element L1, a second lens element L2, a third lens element L3, an aperture diaphragm A, and a cemented lens composed of a fourth lens element L4 and a fifth lens element L5. The first lens element L1, the second lens element L2, and the third lens element L3 constitute a first unit, and the cemented lens constitutes a second unit.

The first lens element L1 is a lens element which has negative optical power and is made of glass. The first lens element L1 is a negative meniscus lens element with the convex surface facing the object side.

The second lens element L2 is a lens element which has negative optical power and is made of resin. The second lens element L2 is a bi-concave lens element. In the second lens element L2, the object-side and image-side concave surfaces are aspheric surfaces. The image-side concave surface is an aspheric surface the negative optical power of which decreases with distance from the optical axis.

The third lens element L3 is a lens element which has positive optical power and is made of resin. The third lens element L3 is a bi-convex lens element. In the third lens element L3, the object-side and image-side convex surfaces are aspheric surfaces. The object-side convex surface is an aspheric surface the positive optical power of which increases with distance from the optical axis. The image-side convex surface is an aspheric surface the positive optical power of which decreases with distance from the optical axis.

The cemented lens is obtained by cementing the fourth lens element L4 and the fifth lens element L5, and has positive optical power. The fourth lens element L4 is a lens element which has negative optical power and is made of glass. The fourth lens element L4 is a negative meniscus lens element with the convex surface facing the object side. The fifth lens element L5 is a lens element which has positive optical power and is made of glass. The fifth lens element L5 is a bi-convex lens element.

In the cemented lens, the object-side convex surface of the fourth lens element L4, a joint surface between the fourth lens element L4 and the fifth lens element L5, and the image-side convex surface of the fifth lens element L5 are aspheric surfaces. The object-side convex surface of the fourth lens element L4 is an aspheric surface the positive optical power of which decreases with distance from the optical axis. The joint surface between the fourth lens element L4 and the fifth lens element L5 is an aspheric surface which is convex toward the object side, and the optical power of which decreases with distance from the optical axis. The image-side convex surface of the fifth lens element L5 is an aspheric surface the positive optical power of which decreases with distance from the optical axis.

Embodiment 2

Figure 3:
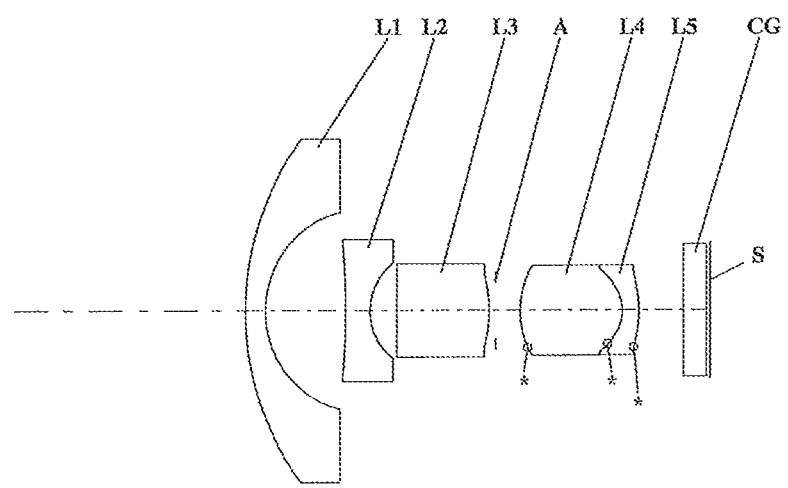
FIG. 3 is a lens arrangement diagram showing an infinity in-focus condition of a single focal length lens system according to Embodiment 2 (Numerical Example 2)
Figure 4:
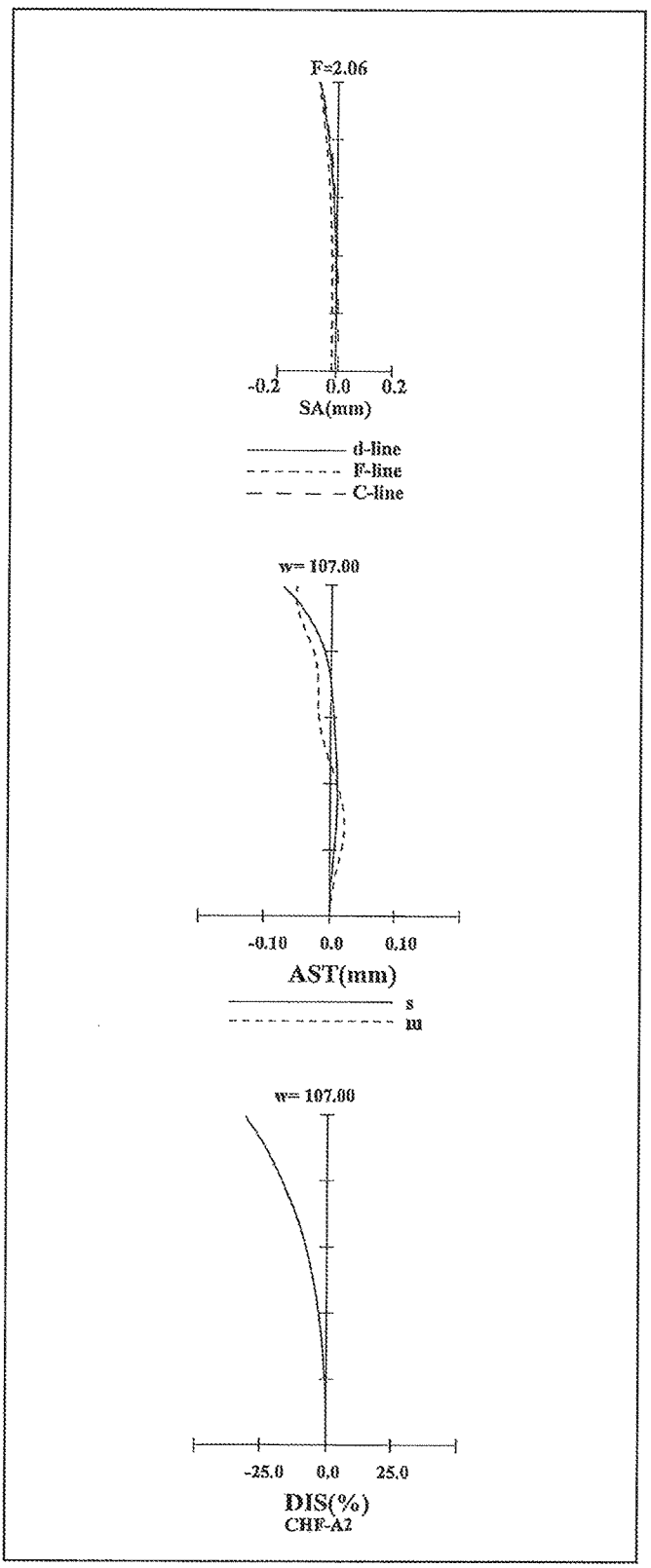
FIG. 4 is a longitudinal aberration diagram of the infinity in-focus condition of the single focal length lens system according to Numerical Example 2.

As shown in FIG. 3, the single focal length lens system according to Embodiment 2, in order from the object side to the image side, comprises a first lens element L1, a second lens element L2, a third lens element L3, an aperture diaphragm A, and a cemented lens composed of a fourth lens element L4 and a fifth lens element L5. The first lens element L1, the second lens element L2, and the third lens element L3 constitute a first unit, and the cemented lens constitutes a second unit.

The first lens element L1 is a lens element which has negative optical power and is made of glass. The first lens element L1 is a negative meniscus lens element with the convex surface facing the object side.

The second lens element L2 is a lens element which has negative optical power and is made of glass. The second lens element L2 is a bi-concave lens element.

The third lens element L3 is a lens element which has positive optical power and is made of glass. The third lens element L3 is a bi-convex lens element.

The cemented lens is obtained by cementing the fourth lens element L4 and the fifth lens element L5, and has positive optical power. The fourth lens element L4 is a lens element which has positive optical power and is made of glass. The fourth lens element L4 is a bi-convex lens element. The fifth lens element L5 is a lens element which has negative optical power and is made of glass. The fifth lens element L5 is a negative meniscus lens element with the concave surface facing the object side.

In the cemented lens, the object-side convex surface of the fourth lens element L4, a joint surface between the fourth lens element L4 and the fifth lens element L5, and the image-side convex surface of the fifth lens element L5 are aspheric surfaces. The object-side convex surface of the fourth lens element L4 is an aspheric surface the positive optical power of which increases with distance from the optical axis. The joint surface between the fourth lens element L4 and the fifth lens element L5 is an aspheric surface which is convex toward the image side, and the optical power of which decreases with distance from the optical axis. The image-side convex surface of the fifth lens element L5 is an aspheric surface the positive optical power of which decreases with distance from the optical axis.

Embodiment 3

Figure 5:
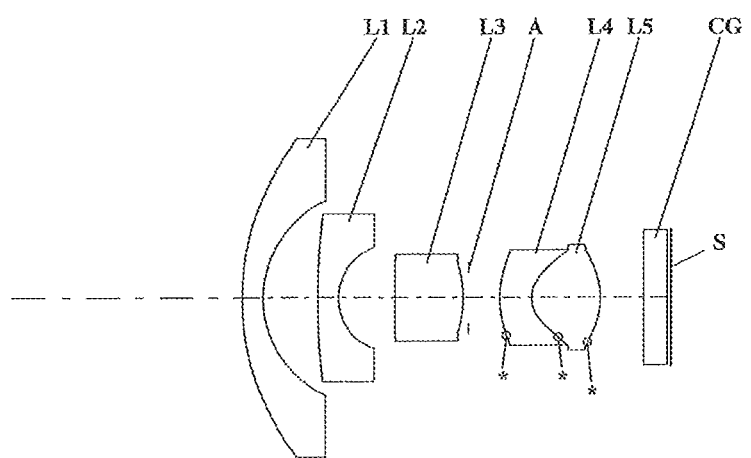
FIG. 5 is a lens arrangement diagram showing an infinity in-focus condition of a single focal length lens system according to Embodiment 3 (Numerical Example 3)
Figure 6:
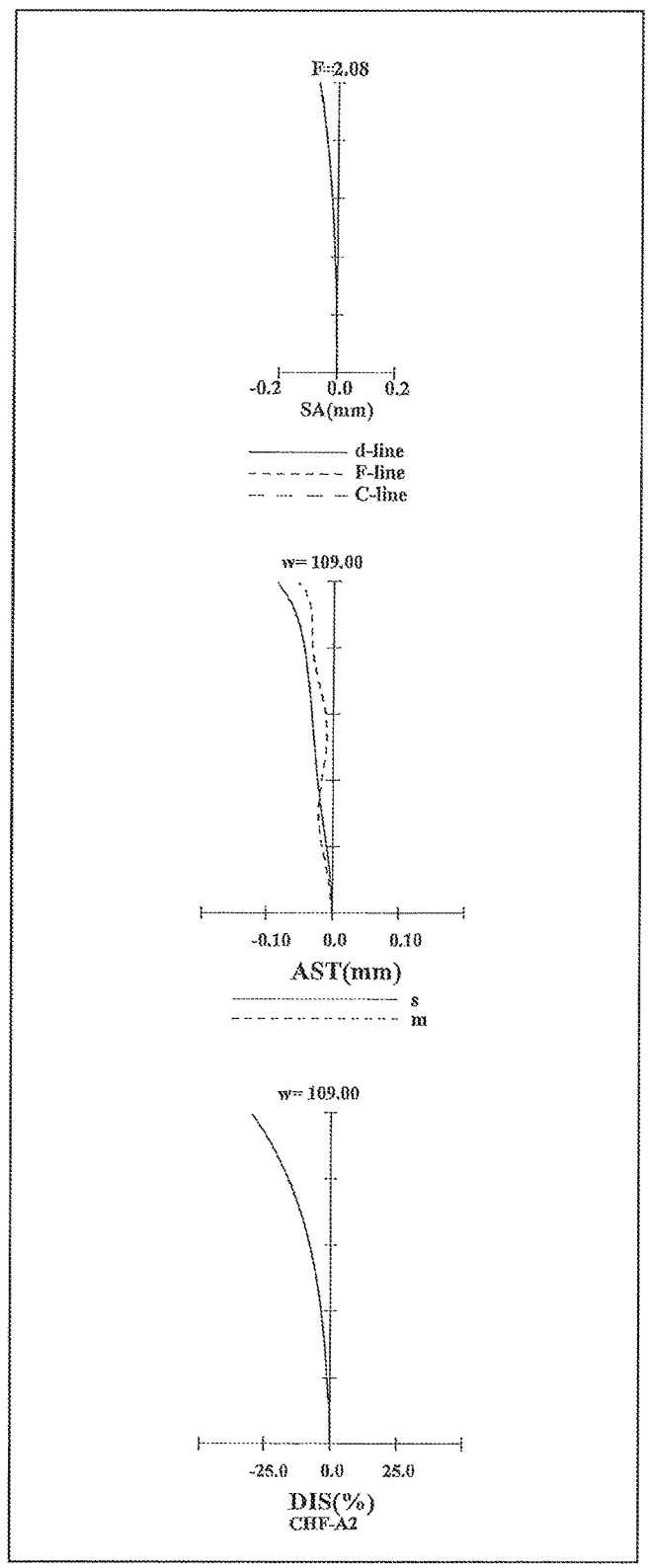
FIG. 6 is a longitudinal aberration diagram of the infinity in-focus condition of the single focal length lens system according to Numerical Example 3.

As shown in FIG. 5, the single focal length lens system according to Embodiment 3, in order from the object side to the image side, comprises a first lens element L1, a second lens element L2, a third lens element L3, an aperture diaphragm A, and a cemented lens composed of a fourth lens element L4 and a fifth lens element L5. The first lens element L1, the second lens element L2, and the third lens element L3 constitute a first unit, and the cemented lens constitutes a second unit.

The first lens element L1 is a lens element which has negative optical power and is made of glass. The first lens element L1 is a negative meniscus lens element with the convex surface facing the object side.

The second lens element L2 is a lens element which has negative optical power and is made of glass. The second lens element L2 is a negative meniscus lens element with the convex surface facing the object side.

The third lens element L3 is a lens element which has positive optical power and is made of glass. The third lens element L3 is a bi-convex lens element.

The cemented lens is obtained by cementing the fourth lens element L4 and the fifth lens element L5, and has positive optical power. The fourth lens element L4 is a lens element which has negative optical power and is made of glass. The fourth lens element L4 is a negative meniscus lens element with the convex surface facing the object side. The fifth lens element L5 is a lens element which has positive optical power and is made of glass. The fifth lens element L5 is a bi-convex lens element.

In the cemented lens, the object-side convex surface of the fourth lens element L4, a joint surface between the fourth lens element L4 and the fifth lens element L5, and the image-side convex surface of the fifth lens element L5 are aspheric surfaces. The object-side convex surface of the fourth lens element L4 is an aspheric surface the positive optical power of which decreases with distance from the optical axis. The joint surface between the fourth lens element L4 and the fifth lens element L5 is an aspheric surface which is convex toward the object side, and the optical power of which decreases with distance from the optical axis. The image-side convex surface of the fifth lens element L5 is an aspheric surface the positive optical power of which decreases with distance from the optical axis.

Embodiment 4

Figure 7:
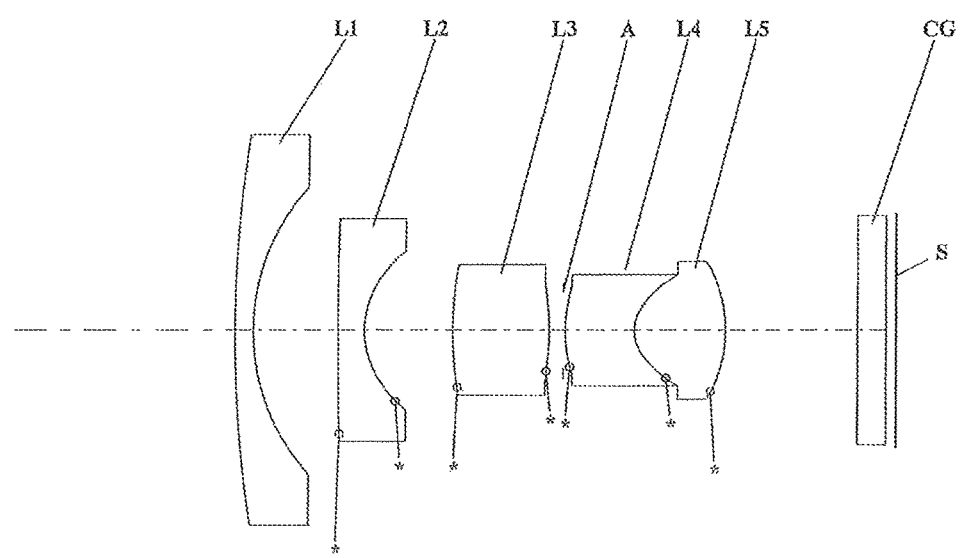
FIG. 7 is a lens arrangement diagram showing an infinity in-focus condition of a single focal length lens system according to Embodiment 4 (Numerical Example 4)
Figure 8:
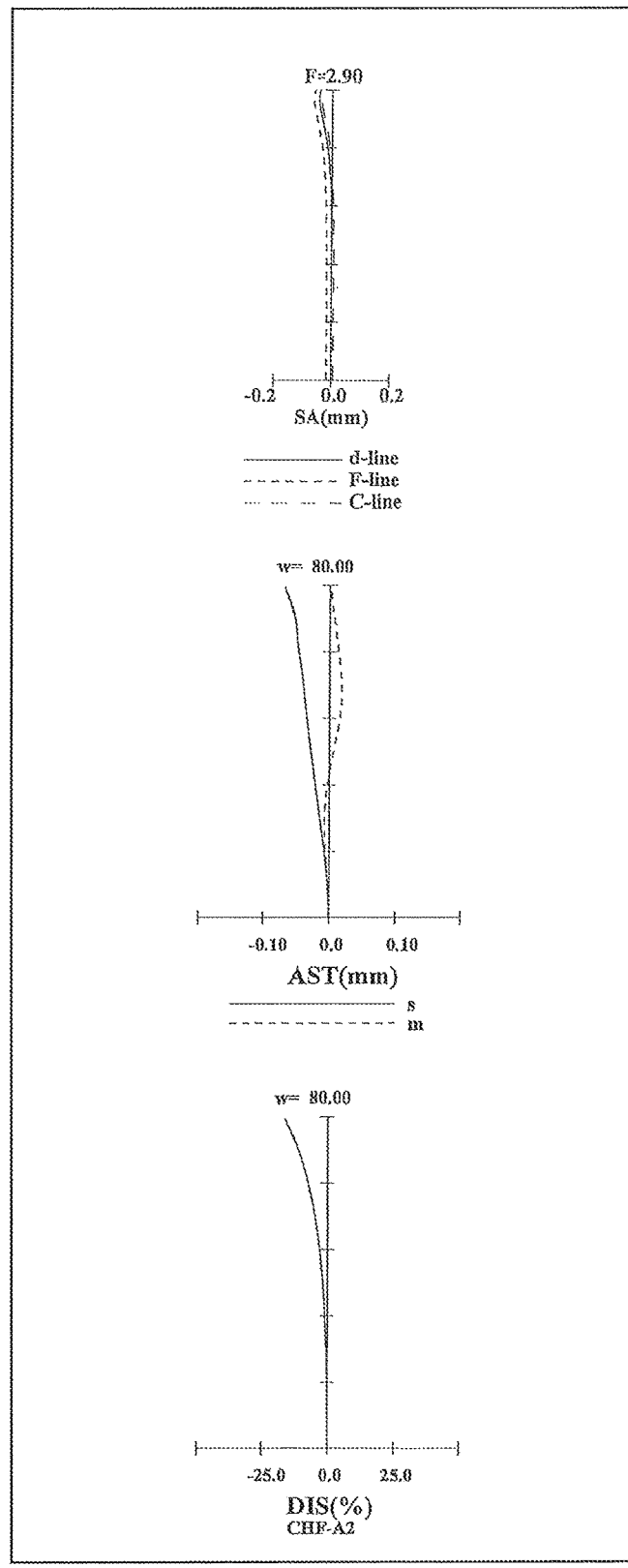
FIG. 8 is a longitudinal aberration diagram of the infinity in-focus condition of the single focal length lens system according to Numerical Example 4.

As shown in FIG. 7, the single focal length lens system according to Embodiment 4, in order from the object side to the image side, comprises a first lens element L1, a second lens element L2, a third lens element L3, an aperture diaphragm A, and a cemented lens composed of a fourth lens element L4 and a fifth lens element L5. The first lens element L1, the second lens element L2, and the third lens element L3 constitute a first unit, and the cemented lens constitutes a second unit.

The first lens element L1 is a lens element which has negative optical power and is made of glass. The first lens element L1 is a negative meniscus lens element with the convex surface facing the object side.

The second lens element L2 is a lens element which has negative optical power and is made of resin. The second lens element L2 is a bi-concave lens element. In the second lens element L2, the object-side and image-side concave surfaces are aspheric surfaces. The object-side concave surface is an aspheric surface the negative optical power of which decreases with distance from the optical axis. The image-side concave surface is an aspheric surface the negative optical power of which decreases with distance from the optical axis.

The third lens element L3 is a lens element which has positive optical power and is made of resin. The third lens element L3 is a bi-convex lens element. In the third lens element L3, the object-side and image-side convex surfaces are aspheric surfaces. The object-side convex surface is an aspheric surface the positive optical power of which decreases with distance from the optical axis.

The cemented lens is obtained by cementing the fourth lens element L4 and the fifth lens element L5, and has positive optical power. The fourth lens element L4 is a lens element which has negative optical power and is made of glass. The fourth lens element L4 is a negative meniscus lens element with the convex surface facing the object side. The fifth lens element L5 is a lens element which has positive optical power and is made of glass. The fifth lens element L5 is a bi-convex lens element.

In the cemented lens, the object-side convex surface of the fourth lens element L4, a joint surface between the fourth lens element L4 and the fifth lens element L5, and the image-side convex surface of the fifth lens element L5 are aspheric surfaces. The object-side convex surface of the fourth lens element L4 is an aspheric surface the positive optical power of which decreases with distance from the optical axis. The joint surface between the fourth lens element L4 and the fifth lens element L5 is an aspheric surface which is convex toward the object side, and the optical power of which decreases with distance from the optical axis. The image-side convex surface of the fifth lens element L5 is an aspheric surface the positive optical power of which decreases with distance from the optical axis.

Embodiment 5

Figure 9:
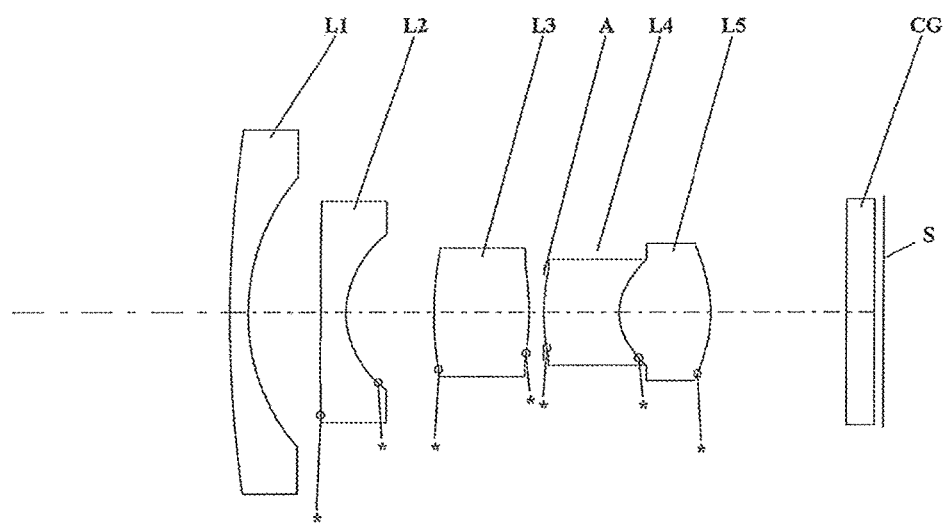
FIG. 9 is a lens arrangement diagram showing an infinity in-focus condition of a single focal length lens system according to Embodiment 5 (Numerical Example 5)
Figure 10:
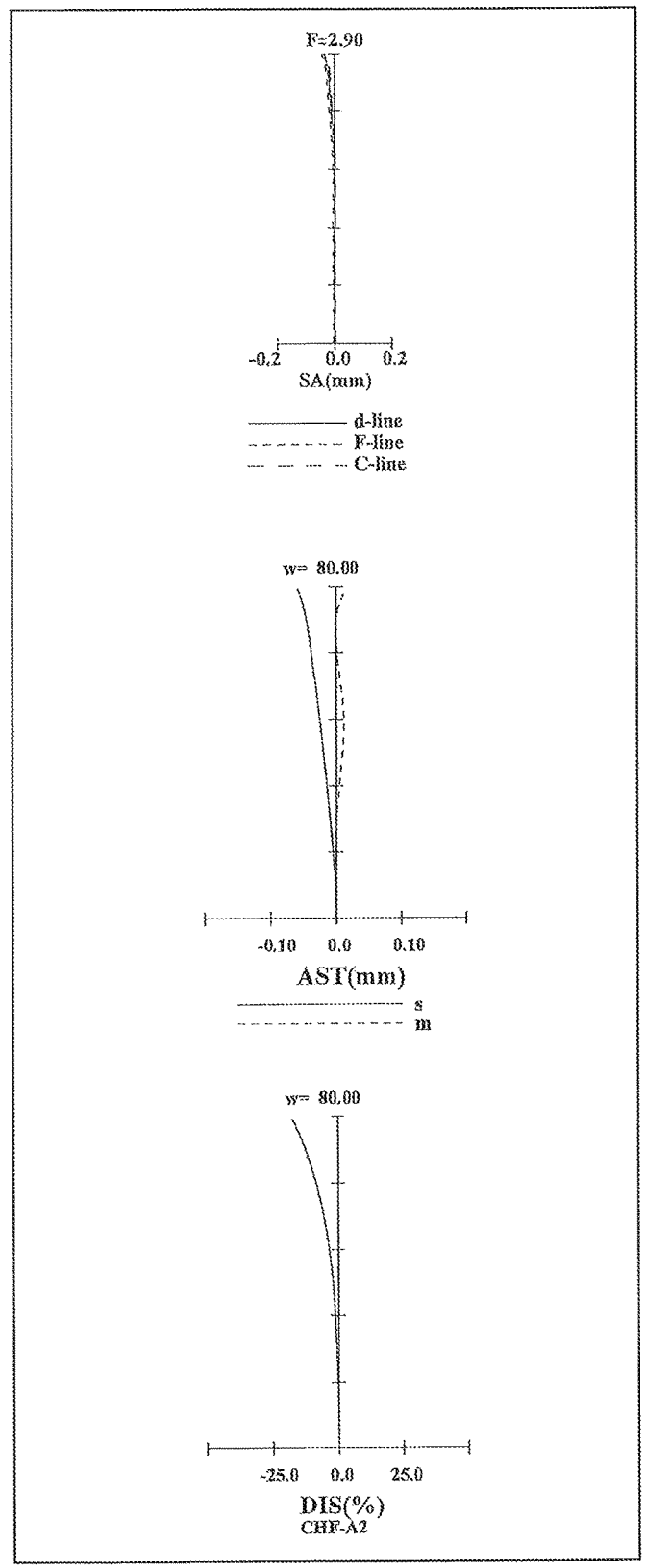
FIG. 10 is a longitudinal aberration diagram of the infinity in-focus condition of the single focal length lens system according to Numerical Example 5.

As shown in FIG. 9, the single focal length lens system according to Embodiment 5, in order from the object side to the image side, comprises a first lens element L1, a second lens element L2, a third lens element L3, an aperture diaphragm A, and a cemented lens composed of a fourth lens element L4 and a fifth lens element L5. The first lens element L1, the second lens element L2, and the third lens element L3 constitute a first unit, and the cemented lens constitutes a second unit.

The first lens element L1 is a lens element which has negative optical power and is made of glass. The first lens element L1 is a negative meniscus lens element with the convex surface facing the object side.

The second lens element L2 is a lens element which has negative optical power and is made of resin. The second lens element L2 is a bi-concave lens element. In the second lens element L2, the object-side and image-side concave surfaces are aspheric surfaces. The object-side concave surface is an aspheric surface the negative optical power of which decreases with distance from the optical axis. The image-side concave surface is an aspheric surface the negative optical power of which decreases with distance from the optical axis.

The third lens element L3 is a lens element which has positive optical power and is made of resin. The third lens element L3 is a bi-convex lens element. In the third lens element L3, the object-side and image-side convex surfaces are aspheric surfaces. The object-side convex surface is an aspheric surface the positive optical power of which decreases with distance from the optical axis.

The cemented lens is obtained by cementing the fourth lens element L4 and the fifth lens element L5, and has positive optical power. The fourth lens element L4 is a lens element which has negative optical power and is made of glass. The fourth lens element L4 is a negative meniscus lens element with the convex surface facing the object side. The fifth lens element L5 is a lens element which has positive optical power and is made of glass. The fifth lens element L5 is a bi-convex lens element.

In the cemented lens, the object-side convex surface of the fourth lens element L4, a joint surface between the fourth lens element L4 and the fifth lens element L5, and the image-side convex surface of the fifth lens element L5 are aspheric surfaces. The joint surface between the fourth lens element L4 and the fifth lens element L5 is an aspheric surface which is convex toward the object side, and the optical power of which decreases with distance from the optical axis. The image-side convex surface of the fifth lens element L5 is an aspheric surface the positive optical power of which decreases with distance from the optical axis.

Embodiment 6

Figure 11:
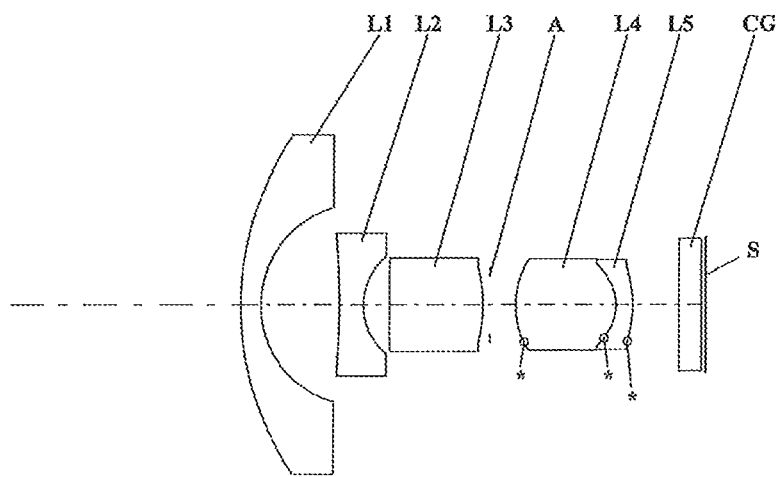
FIG. 11 is a lens arrangement diagram showing an infinity in-focus condition of a single focal length lens system according to Embodiment 6 (Numerical Example 6)
Figure 12:
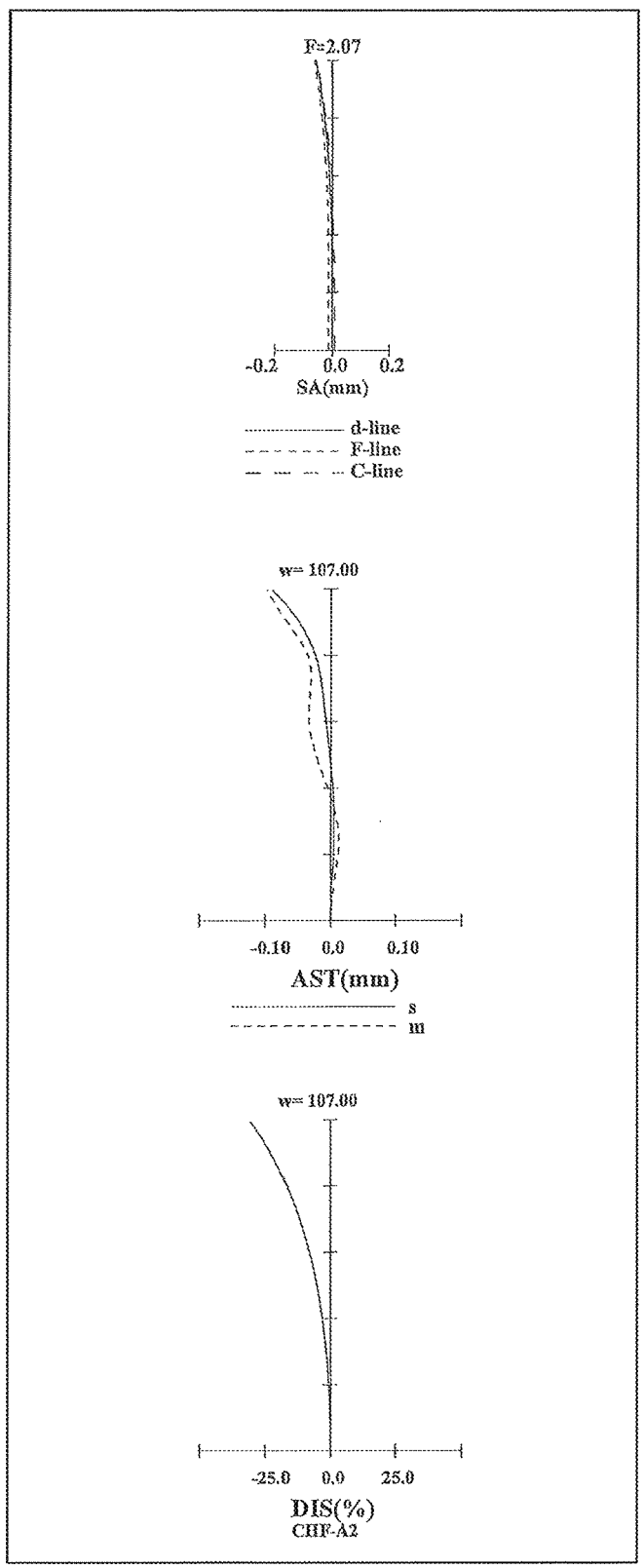
FIG. 12 is a longitudinal aberration diagram of the infinity in-focus condition of the single focal length lens system according to Numerical Example 6.

As shown in FIG. 11, the single focal length lens system according to Embodiment 6, in order from the object side to the image side, comprises a first lens element L1, a second lens element L2, a third lens element L3, an aperture diaphragm A, and a cemented lens composed of a fourth lens element L4 and a fifth lens element L5. The first lens element L1, the second lens element L2, and the third lens element L3 constitute a first unit, and the cemented lens constitutes a second unit.

The first lens element L1 is a lens element which has negative optical power and is made of glass. The first lens element L1 is a negative meniscus lens element with the convex surface facing the object side.

The second lens element L2 is a lens element which has negative optical power and is made of glass. The second lens element L2 is a bi-concave lens element.

The third lens element L3 is a lens element which has positive optical power and is made of glass. The third lens element L3 is a bi-convex lens element.

The cemented lens is obtained by cementing the fourth lens element L4 and the fifth lens element L5, and has positive optical power. The fourth lens element L4 is a lens element which has positive optical power and is made of glass. The fourth lens element L4 is a bi-convex lens element. The fifth lens element L5 is a lens element which has negative optical power and is made of glass. The fifth lens element L5 is a negative meniscus lens element with the concave surface facing the object side.

In the cemented lens, the object-side convex surface of the fourth lens element L4, a joint surface between the fourth lens element L4 and the fifth lens element L5, and the image-side convex surface of the fifth lens element L5 are aspheric surfaces. The object-side convex surface of the fourth lens element L4 is an aspheric surface the positive optical power of which increases with distance from the optical axis. The joint surface between the fourth lens element L4 and the fifth lens element L5 is an aspheric surface which is convex toward the image side, and the optical power of which decreases with distance from the optical axis. The image-side convex surface of the fifth lens element L5 is an aspheric surface the positive optical power of which decreases with distance from the optical axis.

Expanded Examples of Embodiments 1 to 6

Embodiments 1 to 6 have been described above as examples of the technology disclosed in the present application. However, the technology in the present disclosure is not limited thereto, and is also applicable to embodiments in which changes, substitutions, additions, omissions, and/or the like are made as appropriate.

For example, the following materials may be adopted instead of the material of the cemented lenses exemplified in Embodiments 1 to 6. The purpose of adopting the following materials is to allow a relative refractive index temperature coefficient in an atmosphere at 0 to 20° C. with respect to light having a wavelength range of 580 to 640 nm to satisfy a predetermined condition described later. The materials of the cemented lenses are not limited to those described below, and any material may be adopted as long as it is suited to the above purpose.

Alternatives of glass materials adoptable for the above-described lens elements having negative optical power are as follows:

a) HOYA Corporation
   Glass name: M-FDS2, M-FDS1, M-FDS910, M-FD80, M-NBFD10, M-TAFD307
b) Sumita Optical Glass Inc.
   Glass name: K-PSFn203, K-PSFn2, K-PSFn5, K-PSFn1, K-PSFn4, K-PSFn3, K-VC91, K-VC90, K-ZnSF8, K-PG395, K-CD45, K-CD120
c) Ohara Corporation
   Glass name: L-BBH1, L-BBH2, L-NBH54, L-TIH53, L-LAH86, L-TIM28

Examples of glass materials adoptable for the above-described lens elements having positive optical power are as follows:

d) HOYA Corporation
   Glass name: M-FCD500, M-BACDSN, M-PCD51, M-BACD12, M-PCD4, M-BACD12, M-BACD15, M-LAC14, M-LAC130, M-LAC8, M-TAC80, M-TAC60
e) Sumita Optical Glass Inc.
   Glass name: K-GFK70, K-GFK68, K-PSK300, K-LaFK60, K-PSK11, K-CSK120, K-PSK100, K-VC79, K-PSK200, K-VC78, K-LaFK55, K-VC80, K-LaFK50
f) Ohara Corporation
   Glass name: L-LAL13, L-LAL12, L-BAL43, L-BAL42, L-BAL35, S-FPM2, L-PHL2

The following description is given for beneficial conditions that a single focal length lens system like the single focal length lens systems according to Embodiments 1 to 6 can satisfy. Here, a plurality of beneficial conditions are set forth for the single focal length lens system according to each embodiment. A construction that satisfies all the plurality of conditions is most effective for the single focal length lens system. However, when an individual condition is satisfied, a single focal length lens system having the corresponding effect can be obtained.

For example, like the single focal length lens systems according to Embodiments 1 to 6, a single focal length lens system according to the present disclosure, in order from the object side to the image side, includes a first unit, an aperture diaphragm, and a second unit, in which the second unit includes a cemented lens having positive optical power, and a joint surface of the cemented lens is an aspheric surface. Hereinafter, this lens configuration is referred to as a basic configuration of the embodiments.

Since the joint surface of the cemented lens in the second unit is an aspheric surface, color aberration can be satisfactorily compensated for.

In the single focal length lens system having the basic configuration, the cemented lens in the second unit satisfies the following condition (1):

$$|dn/dt1|_{MAX} \leq 2.67 \times 10^{-5} \quad (1)$$

where $|dn/dt1|_{MAX}$ is a maximum value of absolute values of relative refractive index temperature coefficients in an atmosphere at 0 to 20° C. with respect to light having a wavelength range of 580 to 640 nm, which is calculated for each lens element constituting the cemented lens.

The condition (1) is a condition regarding the relative refractive index temperature coefficient of each lens element constituting the cemented lens in the second unit. When the condition (1) is satisfied, the relative refractive index temperature coefficient of the cemented lens having the positive optical power and the aspheric joint surface can be reduced. Therefore, it is possible to reduce defocusing in the optical axis direction which is caused by that the refractive index of the lens element changes when the temperature changes.

When the following condition (1)' is satisfied, the above effect can be achieved more successfully:

$$|dn/dt1|_{MAX} \leq 7.50 \times 10^{-6} \quad (1)'$$

Regarding the defocusing in the optical axis direction which is caused by that the refractive index of the lens element changes when the temperature changes, it is beneficial to satisfy the following condition (a):

$$|dBF/f| \leq 3.50 \times 10^{-4} \quad (a)$$

where dBF is defocusing in the optical axis direction which is caused by a change in the refractive index of each lens element per temperature change of 1° C., and f is a focal length at d-line of the entire system.

In single focal length lens systems according to Numerical Examples 1 to 6 described later, the above condition (a) is satisfied when the cemented lens in the second unit satisfies the above condition (1).

In the present disclosure, for simplification, exponent notation defined in JIS X 0210 "Representation of Numerical Values in Character Strings for Information Interchange" may be used. For example, "$2.67 \times 10^{-5}$" is expressed as "2.67E-05".

It is beneficial that a single focal length lens system having the basic configuration like the single focal length lens system according to Embodiments 1 to 6 satisfies the following condition (2):

$$2\omega_{DIA} \geq 150 \quad (2)$$

where $2\omega_{DIA}$ is a diagonal angle of view (°).

The condition (2) is a condition regarding the diagonal angle of view of the single focal length lens system. In the single focal length lens system according to the present disclosure, defocusing in the optical axis direction, which is caused by that the refractive index of the lens element changes when the temperature changes, can be reduced while satisfying the condition (2).

The single focal length lens system according to the present disclosure can also achieve the above effect by satisfying the following condition (2)':

$$2\omega_{DIA} \geq 160 \quad (2)'$$

The single focal length lens systems according to Numerical Examples 1 to 6 described later realize a wider angle of view while maintaining excellent optical performance by satisfying the condition (2).

When a camera equipped with the single focal length lens system according to the present disclosure is installed in a position on the rear side of the body of an automobile to be used as an in-vehicle camera for checking a rear view, it is beneficial that the diagonal angle of view is large and that the horizontal angle of view is also large to some extent.

Figure 14:
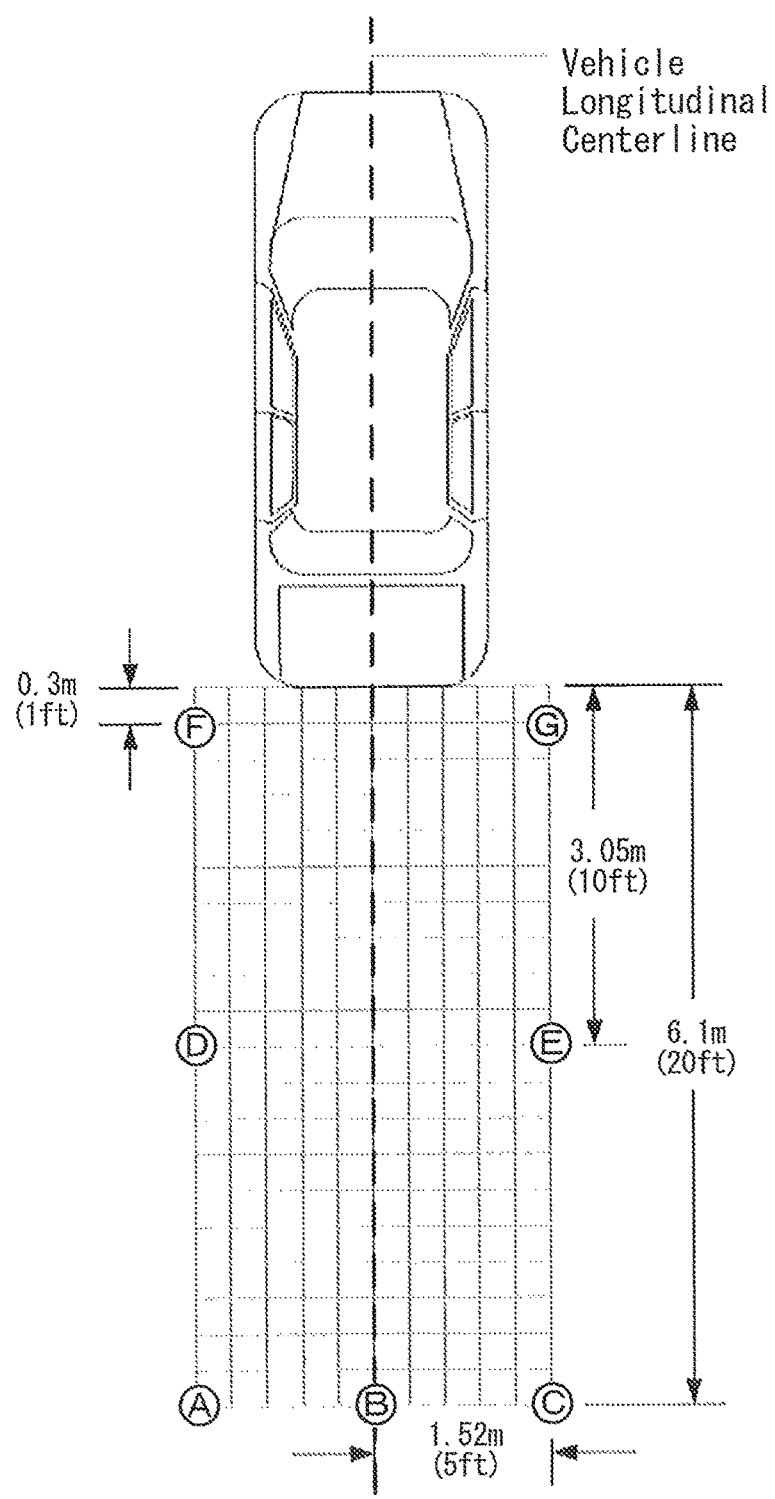
FIG. 14 is a schematic diagram showing: the automobile having the in-vehicle camera at a position on the rear side thereof; points where it is determined whether visual recognition of the back view of the automobile on the basis of an image captured by the in-vehicle camera is possible; and a region including the points.

For example, according to an advisory from National Highway Traffic Safety Administration in the USA, as shown in a schematic view of FIG. 14, there are seven points A to G at which it is determined whether visual recognition of a rear view behind a vehicle by an in-vehicle camera is possible or not, and a range including the seven points A to G has a size of 3.04 m×6.10 m. That is, installation of an in-vehicle camera capable of providing an image (video) with which a driver can visually recognize an object, a person, or the like existing in the range of about 3 m×6 m on the rear side of the vehicle, is going to be mandatory in the USA.

In the case where an image (video) with which a driver can visually recognize an object, a person, or the like having a height of about 80 cm (as high as the average height of infants), for example, is provided at two points F and G closest to the vehicle among the seven points A to G, it is beneficial that the single focal length lens system mounted to the in-vehicle camera satisfies the following condition (b):

$$2\omega_{HOR} \geq 176 \quad (b)$$

where $2\omega_{HOR}$ is a horizontal angle of view (°)

The horizontal angle of view of each of the single focal length lens systems according to Numerical Examples 1 to 6 shown in Table 19 later is a value calculated on the assumption that the ratio of the horizontal width to the vertical width of an imaging device included in the camera according to the present disclosure is 4:3 (=horizontal width: vertical width). When it is assumed that the ratio is 16:9 (=horizontal width:vertical width), the horizontal angle of view of the single focal length lens system becomes wider.

It is beneficial that a single focal length lens system having the basic configuration like the single focal length lens system according to Embodiments 1 to 6 satisfies the following condition (3):

$$2.0 < f_{CEM}/f < 4.0 \quad (3)$$

where $f_{CEM}$ is a focal length at d-line of the cemented lens, and f is the focal length at d-line of the entire system.

The condition (3) is a condition regarding the ratio of the focal length of the cemented lens in the second unit to the focal length of the entire single focal length lens system. When the condition (3) is satisfied, the optical power of the cemented lens in the single focal length lens system can be adjusted to an appropriate value, thereby realizing a compact single focal length lens system having excellent aberration performance. When the value exceeds the upper limit of the condition (3), the optical power of the cemented lens becomes excessively small and the overall length of the lens system is increased, which makes it difficult to reduce the size of the single focal length lens system. When the value goes below the lower limit of the condition (3), the optical power of the cemented lens becomes excessively large and generated aberrations become large, which makes appropriate aberration compensation difficult.

When at least one of the following conditions (3)' and (3)" is satisfied, the above effect can be achieved more successfully:

$$2.4 < f_{CEM}/f \quad (3)'$$

$$f_{CEM}/f < 3.5 \quad (3)''$$

The single focal length lens systems according to Numerical Examples 1 to 6 described later achieve both further size reduction and maintenance of excellent aberration performance by satisfying the condition (3).

In a single focal length lens system having the basic configuration like the single focal length lens system according to Embodiments 1 to 6, it is beneficial that the first unit includes a lens element made of glass and located at a position closest to the object side. Thus, by locating the lens element made of glass at the position closest to the object side in the entire system, environmental resistance of the single focal length lens system can be improved.

It is beneficial that a single focal length lens system having the basic configuration like the single focal length lens systems according to Embodiments 1 to 6, in which the first unit, in order from the object side to the image side, comprises a negative meniscus lens element with the convex surface facing the object side, a lens element having negative optical power (hereinafter sometimes abbreviated as a negative lens element), and a lens element having positive optical power (hereinafter sometimes abbreviated as a positive lens element), satisfies the following condition (4):

$$|dn/dt2|_{MAX} \geq 9.00 \times 10^{-5} \quad (4)$$

where $|dn/dt2|_{MAX}$ is a maximum value of absolute values of relative refractive index temperature coefficients in an atmosphere at 0 to 20° C. with respect to light having a wavelength range of 580 to 640 nm, which is calculated for the negative lens element and the positive lens element constituting the first unit.

The condition (4) is a condition regarding the relative refractive index temperature coefficient of the negative lens element and the positive lens element constituting the first unit. When the condition (4) is satisfied, the optical power of each lens element located on the object side relative to the cemented lens in the second unit can be relatively reduced. Therefore, even when the absolute value of the relative refractive index temperature coefficient is large, defocusing in the optical axis direction which is caused by that the refractive index of the lens element changes when the temperature changes can be canceled by appropriately combining the positive lens element and the negative lens element. Further, when a lens element made of resin and having an aspheric surface is adopted as each of the positive lens element and the negative lens element, cost reduction can be achieved while satisfactorily compensating for various aberrations.

When the following condition (4)' is satisfied, the above effect can be achieved more successfully:

$$|dn/dt2|_{MAX} \geq 1.00 \times 10^{-4} \quad (4)'$$

The single focal length lens systems according to Numerical Examples 1, 4 and 5 described later satisfy the condition (4). Therefore, the single focal length lens systems according to Numerical Example 1, 4 and 5 are configured so as to satisfy the above condition (a) even if the condition (4) is satisfied.

It is beneficial that a single focal length lens system having the basic configuration like the single focal length lens systems according to Embodiments 1 to 6, in which the cemented lens is composed of a negative lens element and a positive lens element, satisfies the following condition (5):

$$Nd_{MIN} > 1.50 \quad (5)$$

where $Nd_{MIN}$ is a refractive index at d-line of the positive lens element constituting the cemented lens.

The condition (5) is a condition regarding the refractive index of the positive lens element constituting the cemented lens. When the condition (5) is satisfied, the curvature radius of the cemented lens can be increased. As a result, the inclination angle of a peripheral portion of the cemented lens can be made gentle, whereby the level of difficulty in manufacturing the cemented lens can be reduced to achieve cost reduction.

When the following condition (5)' is satisfied, the above effect can be achieved more successfully:

$$Nd_{MIN} > 1.55 \quad (5)'$$

The single focal length lens systems according to Numerical Examples 1 to 6 described later realize further cost reduction by satisfying the condition (5).

Embodiment 7: Camera and Automobile

As an example of a camera equipped with the single focal length lens system according to Embodiment 1, an in-vehicle camera will be described. In the in-vehicle camera, any one of the single focal length lens systems according to Embodiments 2 to 6 may be applied instead of the single focal length lens system according to Embodiment 1.

Figure 13:
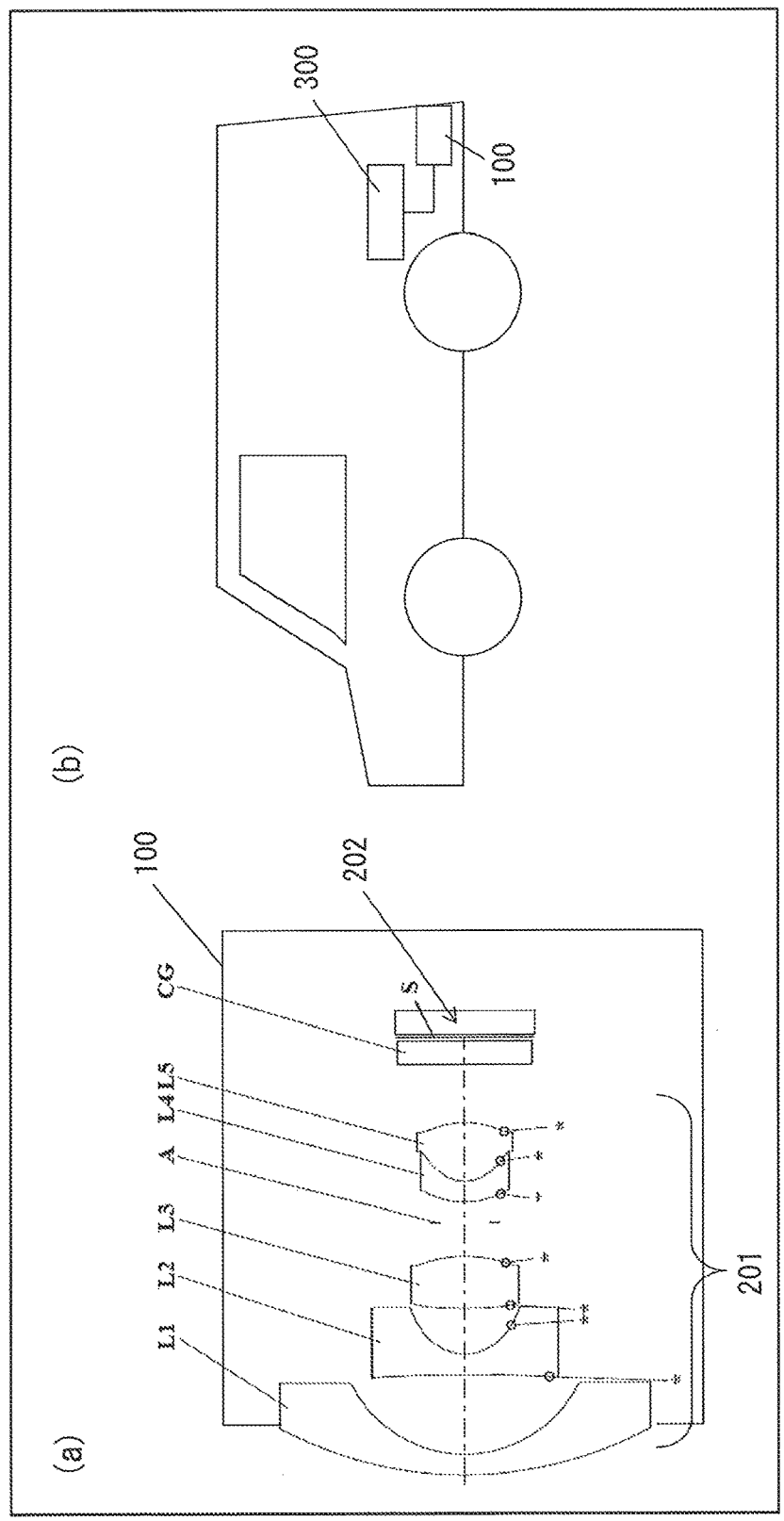
FIG. 13 is a schematic diagram showing an in-vehicle camera including the single focal length lens system according to Embodiment 1, and an automobile having the in-vehicle camera at a position on the rear side thereof.

FIG. 13(a) is a schematic diagram showing an in-vehicle camera equipped with the single focal length lens system according to Embodiment 1. The in-vehicle camera 100 includes the single focal length lens system 201, and an imaging device 202 which captures an image of light converged by the single focal length lens system 201.

The in-vehicle camera 100 is mounted on a vehicle, and is used as a sensing camera or a view camera. An image captured by the sensing camera is used for checking a distance between the vehicle and another vehicle. An image captured by the view camera is displayed on a monitor installed in the vehicle, and is used by a driver to check the views in front of and behind the vehicle.

The single focal length lens system according to the present disclosure is a lens system in which the temperature characteristics are considered, and significant widening of the diagonal angle of view to 150° or more is achieved. Therefore, the single focal length lens system can suppress occurrence of aberrations in the captured image due to temperature change as much as possible, and is effective as a lens system for the view camera.

Next, as an example of an automobile according to the present disclosure, an automobile equipped with the above view camera will be described.

FIG. 13(b) is a schematic diagram showing an automobile having the camera at a position on the rear side thereof. The automobile has the in-vehicle camera 100 at a position on the rear side thereof, and includes a processing unit (CPU) 300 which detects the external environment on the basis of the image captured by the imaging device 202 included in the in-vehicle camera 100, and controls each part.

The imaging device 202 receives the optical image formed by the single focal length lens system 201, and converts the optical image into an electric image signal. The CPU 300 acquires the image signal, checks presence of a pedestrian, an obstacle, or the like, and notifies the driver of presence of a pedestrian, an obstacle, or the like on the basis of the check result.

As described above, the single focal length lens system according to the present disclosure is effective as a lens system for the view camera, but can be used as a lens system for a sensing camera.

As described above, when the in-vehicle camera is applied as a rear view camera (in-vehicle camera for checking a rear view) among view cameras, it is beneficial that the diagonal angle of view is large and that the horizontal angle of view is also large to some extent.

In the case where an image (video) which allows the driver to visually recognize an object, a person, or the like having a height of about 80 cm, for example, is provided at two points F and G closest to the vehicle among the seven points A to G at which it is determined whether visual recognition of the rear view behind the vehicle by the rear view camera is possible or not, in the schematic diagram shown in FIG. 14, it is beneficial that the single focal length lens system included in the in-vehicle camera satisfies the above condition (b), i.e., that the horizontal angle of view is 176° or more. Among the single focal length lens systems according to the present disclosure, the single focal length lens systems according to Embodiments 1 to 3 and 6 each have a large horizontal angle of view of about 190°. Therefore, each of these single focal length lens systems allows visual recognition of a wider view behind the vehicle, and is very effective as a lens system for the rear view camera.

Embodiment 7 has been described as an example of the technology disclosed in the present application. However, the technology in the present disclosure is not limited thereto, and is also applicable to embodiments in which changes, substitutions, additions, omissions, and/or the like are made as appropriate.

While an example in which the single focal length lens system according to any of Embodiments 1 to 6 of the present disclosure is applied to the in-vehicle camera which is the sensing camera or the view camera has been described as Embodiment 7, the single focal length lens system according to the present disclosure is also applicable to, for example, a monitor camera in a monitor system, a Web camera, and the like.

Numerical Examples 1 to 6

The following description is given for numerical examples in which the single focal length lens systems according to Embodiments 1 to 6 are implemented practically. In each numerical example, the units of the length in the tables are all "mm", and the units of the view angle are all "°". In the tables, "view angle" means a diagonal half angle of view. In each numerical example, r is the radius of curvature, d is the axial distance, nd is the refractive index to the d-line, vd is the Abbe number to the d-line, and dn/dt is a relative refractive index temperature coefficient in an atmosphere at 0 to 20° C. with respect to light having a wavelength range of 580 to 640 nm. In each numerical example, the surfaces marked with * are aspheric surfaces, and the aspheric surface configuration is defined by the following expression:

$$Z = \frac{h^2/r}{1 + \sqrt{1 - (1+\kappa)(h/r)^2}} + \sum A_n h^n$$

where

Z is the distance from a point on an aspherical surface at a height h relative to the optical axis to a tangential plane at the vertex of the aspherical surface, h is the height relative to the optical axis,
r is the radius of curvature at the top,
κ is the conic constant, and
$A_n$ is the n-th order aspherical coefficient.

FIGS. 2, 4, 6, 8, 10 and 12 are longitudinal aberration diagrams, in the infinity in-focus condition, of the single focal length lens systems according to Numerical Examples 1 to 6, respectively.

Each longitudinal aberration diagram, in order from the upper side, shows the spherical aberration (SA (mm)), the astigmatism (AST (mm)), and the distortion (DIS (%)).

In each spherical aberration diagram, the vertical axis indicates the F-number (in each Fig., indicated as F), and the solid line, the short dash line, and the long dash line indicate the characteristics to the d-line, the F-line, and the C-line, respectively.

In each astigmatism diagram, the vertical axis indicates the image height, and w indicates the diagonal half angle of view. The solid line and the dash line indicate the characteristics to the sagittal plane (in each Fig., indicated as "s") and the meridional plane (in each Fig., indicated as "m"), respectively.

In each distortion diagram, the vertical axis indicates the image height, and w indicates the diagonal half angle of view. The solid line indicates the distortion when Y=2×f× tan(ω/2) (Y: the image height, f: the focal length of the entire system) is an ideal image height (stereographic projection method).

Numerical Example 1

The single focal length lens system of Numerical Example 1 corresponds to Embodiment 1 shown in FIG. 1. Table 1, Table 2, and Table 3 show the surface data, the aspherical data, and the various data, respectively, of the single focal length lens system of Numerical Example 1.

TABLE 1

(Surface data)

| Surface number | r | d | nd | vd | dn/dt |
|---|---|---|---|---|---|
| Object surface | ∞ | | | | |
| 1 | 11.35070 | 0.60000 | 1.83481 | 42.7 | 4.70E−06 |
| 2 | 3.70350 | 2.32000 | | | |
| 3* | −33.90210 | 0.60000 | 1.53460 | 56.3 | −9.20E−05 |
| 4* | 1.40460 | 1.33000 | | | |
| 5* | 18.02970 | 1.50000 | 1.63450 | 23.9 | −1.10E−04 |
| 6* | −3.47580 | 0.96500 | | | |
| 7(Diaphragm) | ∞ | 0.60000 | | | |
| 8* | 2.41960 | 0.60000 | 1.83271 | 24.1 | −1.10E−06 |
| 9* | 1.06890 | 1.71000 | 1.61881 | 63.9 | −2.90E−06 |
| 10* | −2.28030 | 1.67420 | | | |
| 11 | ∞ | 0.70000 | 1.51680 | 64.1 | 2.20E−06 |
| 12 | ∞ | 0.10000 | | | |
| 13 | ∞ | (BF) | | | |
| Image surface | ∞ | | | | |

TABLE 2

(Aspherical data)

Surface No. 3

K = −3.17199E+02, A4 = 1.09422E−03, A6 = −1.21083E−04, A8 = −1.61127E−05
A10 = 1.45427E−06, A12 = 0.00000E+00, A14 = 0.00000E+00, A16 = 0.00000E+00

Surface No. 4

K = −5.80806E−01, A4 = 1.41103E−02, A6 = −1.86620E−03, A8 = 7.07398E−03
A10 = −1.71716E−03, A12 = −4.33448E−04, A14 = 5.02234E−04, A16 = −1.00984E−04

Surface No. 5

K = 8.20985E+01, A4 = 4.08397E−03, A6 = 3.87174E−03, A8 = −4.22244E−04
A10 = 0.00000E+00, A12 = 0.00000E+00, A14 = 0.00000E+00, A16 = 0.00000E+00

Surface No. 6

K = −2.13843E+00, A4 = 6.46864E−03, A6 = −2.56893E−03, A8 = −2.17942E−04
A10 = 0.00000E+00, A12 = 0.00000E+00, A14 = 0.00000E+00, A16 = 0.00000E+00

Surface No. 8

K = 3.98312E−01, A4 = −8.81298E−03, A6 = 7.79660E−04, A8 = −2.62717E−03
A10 = 2.00824E−03, A12 = −8.08704E−04, A14 = −2.00864E−06, A16 = −1.32875E−06

Surface No. 9

K = −6.78769E−01, A4 = 6.81879E−02, A6 = −8.10911E−02, A8 = 2.89796E−02
A10 = 3.42269E−03, A12 = −2.31368E−03, A14 = −2.71488E−03, A16 = 5.80436E−04

Surface No. 10

K = −1.11291E+00, A4 = 8.63634E−03, A6 = −4.63511E−03, A8 = 2.27847E−02
A10 = −1.51526E−02, A12 = −9.53189E−04, A14 = 5.62029E−03, A16 = −1.57910E−03

TABLE 3

(Various data)

| | |
|---|---|
| Focal length | 0.9801 |
| F-number | 2.07010 |
| View angle | 108.0000 |
| Image height | 1.9000 |
| Overall length of lens | 12.6841 |
| BF | −0.01512 |
| Entrance pupil position | 3.0287 |
| Exit pupil position | −6.3628 |
| Front principal point position | 3.8574 |
| Rear principal point position | 11.7040 |

Single lens data

| Lens | Initial surface No. | Focal length |
|---|---|---|
| 1 | 1 | −6.8286 |
| 2 | 3 | −2.5080 |
| 3 | 5 | 4.7204 |

TABLE 3-continued (Various data)

| | | |
|---|---|---|
| 4 | 8 | −2.8809 |
| 5 | 9 | 1.4613 |

Cemented lens data

| Initial surface No. | Final surface No. | Focal length |
|---|---|---|
| 8 | 10 | 2.7807 |

Numerical Example 2

The single focal length lens system of Numerical Example 2 corresponds to Embodiment 2 shown in FIG. 3. Table 4, Table 5, and Table 6 show the surface data, the aspherical data, and the various data, respectively, of the single focal length lens system of Numerical Example 2.

TABLE 4

(Surface data)

| Surface number | r | d | nd | vd | dn/dt |
|---|---|---|---|---|---|
| Object surface | ∞ | | | | |
| 1 | 8.69940 | 0.60000 | 1.83481 | 42.7 | 4.70E−06 |
| 2 | 3.05460 | 2.45290 | | | |
| 3 | −22.67870 | 0.72110 | 1.77250 | 49.6 | 4.80E−06 |
| 4 | 1.89430 | 0.77250 | | | |
| 5 | 188.81560 | 2.81450 | 1.90366 | 31.3 | 3.40E−06 |
| 6 | −4.15070 | 0.19470 | | | |
| 7(Diaphragm) | ∞ | 0.75700 | | | |
| 8* | 2.77870 | 3.06110 | 1.72903 | 54.0 | 4.10E−06 |
| 9* | −1.22220 | 0.50000 | 2.00178 | 19.3 | 6.30E−06 |
| 10* | −3.14200 | 1.37180 | | | |
| 11 | ∞ | 0.70000 | 1.51680 | 64.1 | 2.20E−06 |
| 12 | ∞ | 0.10000 | | | |
| 13 | ∞ | (BF) | | | |
| Image surface | ∞ | | | | |

TABLE 5

(Aspherical data)

Surface No. 8

K = 3.70812E−02, A4 = 3.34078E−03, A6 = 2.96074E−03, A8 = −8.63765E−04

Surface No. 9

K = −8.91526E−01, A4 = −3.30865E−02, A6 = 8.86206E−03, A8 = 5.10167E−03

Surface No. 10

K = −1.35766E+01, A4 = −2.49491E−02, A6 = 1.95944E−02, A8 = −3.20199E−04

TABLE 6

(Various data)

| | |
|---|---|
| Focal length | 1.0458 |
| F-number | 2.05929 |
| View angle | 107.0000 |
| Image height | 14.0738 |
| Overall length of lens | 12.6841 |
| BF | 0.02818 |
| Entrance pupil position | 2.8513 |
| Exit pupil position | −7.0220 |
| Front principal point position | 3.7419 |
| Rear principal point position | 13.0280 |

TABLE 6-continued (Various data)

Single lens data

| Lens | Initial surface No. | Focal length |
|---|---|---|
| 1 | 1 | −5.9256 |
| 2 | 3 | −2.2346 |
| 3 | 5 | 4.5258 |
| 4 | 8 | 1.7188 |
| 5 | 9 | −2.2960 |

Cemented lens data

| Initial surface No. | Final surface No. | Focal length |
|---|---|---|
| 8 | 10 | 3.3089 |

Numerical Example 3

The single focal length lens system of Numerical Example 3 corresponds to Embodiment 3 shown in FIG. 5. Table 7, Table 8, and Table 9 show the surface data, the aspherical data, and the various data, respectively, of the single focal length lens system of Numerical Example 3.

TABLE 7

(Surface data)

| Surface number | r | d | nd | vd | dn/dt |
|---|---|---|---|---|---|
| Object surface | ∞ | | | | |
| 1 | 7.87980 | 0.60000 | 1.83481 | 42.7 | 4.70E−06 |
| 2 | 3.17420 | 1.69190 | | | |
| 3 | 22.03630 | 0.60000 | 1.77250 | 49.6 | 4.80E−06 |
| 4 | 1.60000 | 1.71810 | | | |
| 5 | 71.26080 | 2.07950 | 1.90366 | 31.3 | 3.40E−06 |
| 6 | −3.44130 | 0.16080 | | | |
| 7(Diaphragm) | ∞ | 0.92020 | | | |
| 8* | 2.89540 | 0.94730 | 1.82115 | 24.1 | −2.00E−07 |
| 9* | 0.85900 | 2.10720 | 1.61881 | 63.9 | −2.90E−06 |

TABLE 7-continued (Surface data)

| Surface number | r | d | nd | vd | dn/dt |
|---|---|---|---|---|---|
| 10* | −2.10700 | 1.32820 | | | |
| 11 | ∞ | 0.70000 | 1.51680 | 64.1 | 2.20E−06 |
| 12 | ∞ | 0.10000 | | | |
| 13 | ∞ | (BF) | | | |
| Image surface | ∞ | | | | |

TABLE 8

(Aspherical data)

Surface No. 8

K = −8.88056E−01, A4 = −8.21796E−03, A6 = −4.02136E−03, A8 = 2.92067E−03
A10 = −6.35903E−04, A12 = 0.00000E+00
Surface No. 9

K = −1.07923E+00, A4 = 5.38597E−02, A6 = −5.47753E−02, A8 = 1.84038E−02
A10 = −1.16473E−03, A12 = −8.46024E−04
Surface No. 10

K = −7.62804E−01, A4 = 2.28416E−03, A6 = 1.26424E−02, A8 = −7.95749E−03
A10 = 2.46051E−03, A12 = 0.00000E+00

TABLE 9

(Various data)

| | | |
|---|---|---|
| Focal length | | 0.9964 |
| F-number | | 2.07826 |
| View angle | | 109.0000 |
| Image height | | 1.9559 |
| Overall length of lens | | 12.9880 |
| BF | | 0.03478 |
| Entrance pupil position | | 2.7122 |
| Exit pupil position | | −12.0223 |
| Front principal point position | | 3.6263 |
| Rear principal point position | | 11.9916 |

Single lens data

| Lens | Initial surface No. | Focal length |
|---|---|---|
| 1 | 1 | −6.7593 |
| 2 | 3 | −2.2623 |
| 3 | 5 | 3.6814 |
| 4 | 8 | −1.8821 |
| 5 | 9 | 1.3538 |

Cemented lens data

| Initial surface No. | Final surface No. | Focal length |
|---|---|---|
| 8 | 10 | 3.3167 |

Numerical Example 4

The single focal length lens system of Numerical Example 4 corresponds to Embodiment 4 shown in FIG. 7.

Table 10, Table 11, and Table 12 show the surface data, the aspherical data, and the various data, respectively, of the single focal length lens system of Numerical Example 4.

TABLE 10

(Surface data)

| Surface number | r | d | nd | vd | dn/dt |
|---|---|---|---|---|---|
| Object surface | ∞ | | | | |
| 1 | 37.92220 | 0.60000 | 1.72916 | 54.7 | 2.60E−06 |
| 2 | 6.70500 | 2.70000 | | | |
| 3* | −835.48100 | 0.84000 | 1.53460 | 56.3 | −9.20E−05 |
| 4* | 2.66920 | 2.81000 | | | |
| 5* | 11.09970 | 3.09000 | 1.63450 | 23.9 | −1.10E−04 |
| 6* | −8.83650 | 0.45000 | | | |
| 7(Diaphragm) | ∞ | 0.06000 | | | |
| 8* | 4.68880 | 2.15550 | 1.68893 | 31.2 | −2.90E−06 |
| 9* | 1.16450 | 2.90750 | 1.55332 | 71.7 | −5.70E−06 |
| 10* | −3.95110 | 4.21560 | | | |
| 11 | ∞ | 0.90000 | 1.51680 | 64.2 | 2.60E−06 |
| 12 | ∞ | 0.30000 | | | |
| 13 | ∞ | (BF) | | | |
| Image surface | ∞ | | | | |

TABLE 11

(Aspherical data)

Surface No. 3

K = 1.00000E+03, A4 = 4.07645E−04, A6 = −3.78260E−07, A8 = −9.85094E−08
A10 = −1.33542E−08, A12 = −8.45609E−10, A14 = −7.49711E−12, A16 = −6.25430E−13
Surface No. 4

K = −8.25858E−01, A4 = 2.57983E−05, A6 = 2.23395E−04, A8 = 5.79271E−06
A10 = 3.72598E−06, A12 = 7.21702E−09, A14 = 0.00000E+00, A16 = 0.00000E+00
Surface No. 5

K = −3.39245E+01, A4 = 1.38898E−03, A6 = 1.24680E−04, A8 = −1.56215E−06
A10 = 4.29395E−06, A12 = 2.45888E−07, A14 = 0.00000E+00, A16 = 0.00000E+00
Surface No. 6

K = 1.10394E+00, A4 = −8.14425E−04, A6 = 9.44115E−04, A8 = −3.93687E−05
A10 = 2.93378E−06, A12 = 5.03951E−08, A14 = −3.34428E−07, A16 = 5.75048E−07
Surface No. 8

K = −2.57270E+00, A4 = −9.82327E−04, A6 = 7.72242E−04, A8 = 1.89571E−04
A10 = −2.55084E−04, A12 = 1.39069E−04, A14 = 6.11709E−05, A16 = −4.97849E−05

TABLE 11-continued (Aspherical data)

Surface No. 9

K = −9.39432E−01, A4 = −7.58456E−03, A6 = 2.94691E−04, A8 = 9.79729E−04
A10 = −8.26440E−06, A12 = −3.64238E−05, A14 = 2.64487E−05, A16 = −8.11723E−06
Surface No. 10

K = −1.90909E+00, A4 = −1.11112E−03, A6 = 5.28479E−04, A8 = −1.26240E−04
A10 = −9.92121E−06, A12 = 2.82318E−06, A14 = 8.43271E−07, A16 = −3.14709E−07

TABLE 12

(Various data)

| Focal length | 2.5577 |
| F-number | 2.90243 |
| View angle | 80.0000 |
| Image height | 3.5931 |
| Overall length of lens | 21.0449 |
| BF | 0.01630 |
| Entrance pupil position | 4.2490 |
| Exit pupil position | −10.3679 |
| Front principal point position | 6.1767 |
| Rear principal point position | 18.4872 |

Single lens data

| Lens | Initial surface No. | Focal length |
|---|---|---|
| 1 | 1 | −11.2618 |
| 2 | 3 | −4.9753 |
| 3 | 5 | 8.2502 |
| 4 | 8 | −2.9963 |
| 5 | 9 | 2.0381 |

Cemented lens data

| Initial surface No. | Final surface No. | Focal length |
|---|---|---|
| 8 | 10 | 6.5624 |

Numerical Example 5

The single focal length lens system of Numerical Example 5 corresponds to Embodiment 5 shown in FIG. 9. Table 13, Table 14, and Table 15 show the surface data, the aspherical data, and the various data, respectively, of the single focal length lens system of Numerical Example 5.

TABLE 13

(Surface data)

| Surface number | r | d | nd | vd | dn/dt |
|---|---|---|---|---|---|
| Object surface | ∞ | | | | |
| 1 | 38.72870 | 0.60000 | 1.72916 | 54.7 | 2.60E−06 |
| 2 | 6.63090 | 2.30000 | | | |
| 3* | −229.63260 | 0.84000 | 1.53460 | 56.3 | −9.20E−05 |
| 4* | 2.68390 | 2.85000 | | | |
| 5* | 10.93090 | 3.09000 | 1.63450 | 23.9 | −1.10E−04 |
| 6* | −8.71100 | 0.47000 | | | |
| 7(Diaphragm) | ∞ | 0.00000 | | | |
| 8* | 5.81610 | 2.40000 | 1.82115 | 24.1 | −2.00E−07 |
| 9* | 1.64400 | 2.95000 | 1.61881 | 63.9 | −2.90E−06 |
| 10* | −4.15220 | 4.35500 | | | |
| 11 | ∞ | 0.90000 | 1.51680 | 64.2 | 2.60E−06 |
| 12 | ∞ | 0.30000 | | | |
| 13 | ∞ | (BF) | | | |
| Image surface | ∞ | | | | |

TABLE 14

(Aspherical data)

Surface No. 3

K = 1.00000E+03, A4 = 4.07630E−04, A6 = −4.09635E−07, A8 = −1.02624E−07
A10 = −1.36542E−08, A12 = −8.51123E−10, A14 = −6.47434E−12, A16 = −4.26061E−13
Surface No. 4

K = −8.26237E−01, A4 = 2.25543E−05, A6 = 2.23243E−04, A8 = 5.83952E−06
A10 = 3.73936E−06, A12 = 9.83906E−09, A14 = 0.00000E+00, A16 = 0.00000E+00
Surface No. 5

K = −3.38965E+01, A4 = 1.39142E−03, A6 = 1.25248E−04, A8 = −1.38836E−06
A10 = 4.35285E−06, A12 = 2.65445E−07, A14 = 0.00000E+00, A16 = 0.00000E+00
Surface No. 6

K = 1.07958E+00, A4 = −8.10132E−04, A6 = 9.49817E−04, A8 = −3.72019E−05
A10 = 3.00728E−06, A12 = −5.99960E−07, A14 = −7.14312E−07, A16 = 3.29022E−07
Surface No. 8

K = −6.22451E−01, A4 = −2.20975E−03, A6 = −1.71634E−05, A8 = 8.30452E−04
A10 = −2.37223E−04, A12 = −8.76248E−05, A14 = 1.00417E−05, A16 = 1.81446E−05
Surface No. 9

K = −8.91638E−01, A4 = −8.12343E−03, A6 = −5.92764E−04, A8 = 8.23238E−04
A10 = −1.63472E−04, A12 = 9.70445E−06, A14 = 6.34900E−06, A16 = −1.16995E−06

TABLE 14-continued (Aspherical data)

Surface No. 10

K = −2.11980E+00, A4 = −6.16754E−04, A6 = 4.65339E−04, A8 = −5.80184E−05
A10 = 3.77877E−06, A12 = −2.44485E−07, A14 = 5.38180E−07, A16 = −9.44250E−08

TABLE 15

(Various data)

| | |
|---|---|
| Focal length | 2.5944 |
| F-number | 2.89890 |
| View angle | 80.0000 |
| Image height | 3.5924 |
| Overall length of lens | 21.0665 |
| BF | 0.01154 |
| Entrance pupil position | 4.0506 |
| Exit pupil position | −10.5328 |
| Front principal point position | 6.0066 |
| Rear principal point position | 18.4722 |

Single lens data

| Lens | Initial surface No. | Focal length |
|---|---|---|
| 1 | 1 | −11.0597 |
| 2 | 3 | −4.9561 |
| 3 | 5 | 8.1372 |
| 4 | 8 | −3.7684 |
| 5 | 9 | 2.3629 |

Cemented lens data

| Initial surface No. | Final surface No. | Focal length |
|---|---|---|
| 8 | 10 | 6.6150 |

Numerical Example 6

The single focal length lens system of Numerical Example 6 corresponds to Embodiment 6 shown in FIG. 11. Table 16, Table 17, and Table 18 show the surface data, the aspherical data, and the various data, respectively, of the single focal length lens system of Numerical Example 6.

TABLE 16

(Surface data)

| Surface number | r | d | nd | vd | dn/dt |
|---|---|---|---|---|---|
| Object surface | ∞ | | | | |
| 1 | 9.00620 | 0.60000 | 1.83481 | 42.7 | 4.70E−06 |
| 2 | 3.00700 | 2.40280 | | | |
| 3 | −27.06920 | 0.73760 | 1.77250 | 49.6 | 4.80E−06 |
| 4 | 1.89060 | 0.77430 | | | |
| 5 | 141.82810 | 2.82050 | 1.90366 | 31.3 | 3.40E−06 |
| 6 | −4.16160 | 0.20770 | | | |
| 7(Diaphragm) | ∞ | 0.78630 | | | |
| 8* | 2.70060 | 3.05190 | 1.72903 | 54.0 | 4.10E−06 |
| 9* | −1.36960 | 0.50000 | 2.14780 | 17.3 | 2.67E−05 |
| 10* | −2.99990 | 1.36780 | | | |
| 11 | ∞ | 0.70000 | 1.51680 | 64.1 | 2.20E−06 |
| 12 | ∞ | 0.10000 | | | |
| 13 | ∞ | (BF) | | | |
| Image surface | ∞ | | | | |

TABLE 17

(Aspherical data)

Surface No. 8

K = −9.59574E−02, A4 = 3.40436E−03, A6 = 2.98797E−03, A8 = −6.90765E−04

Surface No. 9

K = −1.00383E+00, A4 = −2.77855E−02, A6 = 4.22185E−04, A8 = 6.41574E−03

Surface No. 10

K = −1.14849E+01, A4 = −2.72463E−02, A6 = 1.80108E−02, A8 = 1.82867E−04

TABLE 18

(Various data)

| | |
|---|---|
| Focal length | 1.0424 |
| F-number | 2.07151 |
| View angle | 107.0000 |
| Image height | 1.9453 |
| Overall length of lens | 14.0835 |
| BF | 0.03458 |
| Entrance pupil position | 2.7915 |
| Exit pupil position | −7.0516 |
| Front principal point position | 3.6806 |
| Rear principal point position | 13.0411 |

Single lens data

| Lens | Initial surface No. | Focal length |
|---|---|---|
| 1 | 1 | −5.6653 |
| 2 | 3 | −2.2625 |
| 3 | 5 | 4.5154 |
| 4 | 8 | 1.8228 |
| 5 | 9 | −2.6261 |

Cemented lens data

| Initial surface No. | Final surface No. | Focal length |
|---|---|---|
| 8 | 10 | 3.3289 |

The following Table 19 shows the corresponding values to the individual conditions in the single focal length lens systems according to the respective Numerical Examples.

TABLE 19

(Values corresponding to conditions)

| Conditions | Numerical Examples | | | | | |
|---|---|---|---|---|---|---|
| | 1 | 2 | 3 | 4 | 5 | 6 |
| (1) $|dn/dt1|_{MAX}$ | 2.90E-06 | 6.30E-06 | 2.90E-06 | 5.70E-06 | 2.90E-06 | 2.67E-05 |
| (2) $2\omega_{DIA}$ | 216 | 214 | 218 | 160 | 160 | 214 |
| (3) $f_{CEM}/f$ | 2.8372 | 3.1641 | 3.3286 | 2.5657 | 2.5498 | 3.1935 |
| (4) $|dn/dt2|_{MAX}$ | 1.10E-04 | 4.80E-06 | 4.80E-06 | 1.10E-04 | 1.10E-04 | 4.80E-06 |
| (5) $Nd_{MIN}$ | 1.61881 | 1.72903 | 1.61881 | 1.55332 | 1.61881 | 1.72903 |
| (a) $|dBF/f|$ | 1.59E-04 | 1.46E-05 | 2.11E-05 | 2.50E-04 | 2.29E-04 | 1.68E-05 |
| (b) $2\omega_{HOR}$ | 193 | 189 | 193 | 124 | 123 | 190 |
| f | 0.9801 | 1.0458 | 0.9964 | 2.5577 | 2.5944 | 1.0424 |
| $f_{CEM}$ | 2.7807 | 3.3089 | 3.3167 | 6.5624 | 6.6150 | 3.3289 |
| dBF | 1.56E-04 | -1.52E-05 | 2.10E-05 | 6.40E-04 | 5.95E-04 | 1.75E-05 |

The present disclosure is applicable to an in-vehicle camera, a monitor camera, a Web camera, and the like. In particular, the present disclosure is beneficial in a camera which is required to have a wide-angle lens system, such as an in-vehicle camera and a monitor camera.

As presented above, the embodiments have been described as examples of the technology according to the present disclosure. For this purpose, the accompanying drawings and the detailed description are provided.

Therefore, components in the accompanying drawings and the detail description may include not only components essential for solving problems, but also components that are provided to illustrate the above described technology and are not essential for solving problems. Therefore, such inessential components should not be readily construed as being essential based on the fact that such inessential components are shown in the accompanying drawings or mentioned in the detailed description.

Further, the above described embodiments have been described to exemplify the technology according to the present disclosure, and therefore, various modifications, replacements, additions, and omissions may be made within the scope of the claims and the scope of the equivalents thereof.

What is claimed is:

1. A lens system, in order from an object side to an image side, comprising:
   a first unit;
   an aperture diaphragm; and
   a second unit, wherein
   the second unit includes a cemented lens composed of two glass lenses,
   a cemented-side surface of each of the two glass lenses is an aspheric surface.

2. A lens system as claimed in claim 1, wherein the first unit has a negative optical power, and the second unit has a positive optical power.

3. A lens system as claimed in claim 1, wherein the cemented lens has a positive optical power.

4. A lens system as claimed in claim 1, wherein the cemented surface of each of the two glass lenses is an aspheric surface an optical power of which decreases with distance from the optical axis.

5. A lens system as claimed in claim 1, wherein the following conditions (1) is satisfied:

$$|dn/dt1|_{MAX} \leq 2.67 \times 10^{-5} \quad (1)$$

where
$|dn/dt1|MAX$ is a maximum value of absolute values of relative refractive index temperature coefficients in an atmosphere at 0 to 20° C. with respect to light having a wavelength range of 580 to 640 nm, which is calculated for each of lenses constituting the cemented lens.

6. A lens system as claimed in claim 1, wherein the following condition (3) is satisfied:

$$2.0 < f_{CEM}/f < 4.0 \quad (3)$$

where
$f_{CEM}$ is a focal length at d-line of the cemented lens, and f is a focal length at d-line of the lens system.

7. A lens system as claimed in claim 1, wherein the following condition (2) is satisfied:

$$2\omega_{DIA} \geq 150 \quad (2)$$

where
$2\omega_{DIA}$ is a diagonal angle of view (°).

8. A lens system as claimed in claim 5, wherein
the first unit, in order from the object side to the image side, comprises:
   a first lens;
   a second lens; and
   a third lens, and
the following condition (4) is satisfied:

$$|dn/dt2|_{MAX} \geq 9.00 \times 10^{-5} \quad (4)$$

where
$|dn/dt2|_{MAX}$ is a maximum value of absolute values of relative refractive index temperature coefficients in an atmosphere at 0 to 20° C. with respect to light having a wavelength range of 580 to 640 nm, which is calculated for each of the second lens and the third lens.

* * * * *